(12) United States Patent
Lee

(10) Patent No.: US 11,511,731 B2
(45) Date of Patent: Nov. 29, 2022

(54) VEHICLE AND METHOD OF CONTROLLING THE SAME

(71) Applicant: MANDO CORPORATION, Pyeongtaek-si (KR)

(72) Inventor: Sang Yeob Lee, Seongnam-si (KR)

(73) Assignee: HL Klemove Corp., Incheon (KR)

(*) Notice: Subject to any disclaimer, the term of this patent is extended or adjusted under 35 U.S.C. 154(b) by 288 days.

(21) Appl. No.: 16/751,452

(22) Filed: Jan. 24, 2020

(65) Prior Publication Data

US 2020/0254995 A1 Aug. 13, 2020

(30) Foreign Application Priority Data

Feb. 12, 2019 (KR) .................. 10-2019-0015865

(51) Int. Cl.
*B60W 30/02* (2012.01)
*B60W 10/18* (2012.01)
(Continued)

(52) U.S. Cl.
CPC .............. *B60W 30/02* (2013.01); *B60Q 9/00* (2013.01); *B60R 11/04* (2013.01); *B60W 10/18* (2013.01); *B60W 50/14* (2013.01); *G01S 13/867* (2013.01); *G01S 13/931* (2013.01); *G06T 7/246* (2017.01); *G06T 7/60* (2013.01); *G06V 20/58* (2022.01); *B60W 2050/143* (2013.01);
(Continued)

(58) Field of Classification Search
None
See application file for complete search history.

(56) References Cited

U.S. PATENT DOCUMENTS 9,118,816 B2 * 8/2015 Stein .................. G06K 9/00798
9,598,086 B2 * 3/2017 Heim ..................... G06T 7/579
(Continued)

FOREIGN PATENT DOCUMENTS

JP  H05-262113 A     10/1993
JP  2018052427 A  *   4/2018
KR  10-2018-0042987 A  4/2018

*Primary Examiner* — Maceeh Anwari
*Assistant Examiner* — Jacob Daniel Underbakke
(74) *Attorney, Agent, or Firm* — Morgan, Lewis & Bockius LLP

(57) ABSTRACT

A vehicle includes: recognizing a forward vehicle in response to the processing of image data captured by an image sensor disposed at the vehicle so as to have a field of view of the outside of the vehicle; obtaining a distance from the forward vehicle in response to the processing of detecting data captured by a radar disposed at the vehicle so as to have a detecting area of the outside of the vehicle; obtaining a change amount of vertical movement of the forward vehicle in the image data in response to the distance from the forward vehicle that is equal to or less than a reference distance; obtaining a height of an obstacle on a road surface corresponding to the change amount; obtaining the height of the obstacle on the road surface in the image data in response to the distance from the forward vehicle that exceeds the reference distance; identifying a driving speed of the vehicle; identifying a reference height corresponding to the driving speed of the vehicle; and outputting deceleration guide information in response to the height of the obstacle on the road surface that is greater than or equal to the reference height.

11 Claims, 15 Drawing Sheets

(51) Int. Cl.
*G06T 7/60* (2017.01)
*B60R 11/04* (2006.01)
*G06V 20/58* (2022.01)
*B60Q 9/00* (2006.01)
*B60W 50/14* (2020.01)
*G01S 13/86* (2006.01)
*G01S 13/931* (2020.01)
*G06T 7/246* (2017.01)

(52) U.S. Cl.
CPC ..... *B60W 2420/42* (2013.01); *B60W 2420/52* (2013.01); *B60W 2510/22* (2013.01); *G01S 2013/932* (2020.01); *G01S 2013/93185* (2020.01); *G01S 2013/93271* (2020.01); *G01S 2013/93274* (2020.01); *G06T 2207/30261* (2013.01)

(56) References Cited

U.S. PATENT DOCUMENTS

| | | | | |
|---|---|---|---|---|
| 10,486,485 | B1* | 11/2019 | Levinson | B60G 17/0162 |
| 11,150,649 | B2* | 10/2021 | Sato | B60W 50/0097 |
| 2004/0080450 | A1* | 4/2004 | Cheong | G01S 7/4026 |
| | | | | 342/118 |
| 2009/0312906 | A1* | 12/2009 | Bauer | B60W 40/04 |
| | | | | 701/36 |
| 2012/0203428 | A1* | 8/2012 | Choi | B60G 17/08 |
| | | | | 701/37 |
| 2013/0141580 | A1* | 6/2013 | Stein | B60W 40/076 |
| | | | | 348/148 |
| 2015/0120153 | A1* | 4/2015 | Heim | G06K 9/00805 |
| | | | | 701/51 |
| 2016/0046166 | A1* | 2/2016 | Norton | B60G 17/08 |
| | | | | 701/37 |
| 2017/0270372 | A1* | 9/2017 | Stein | G06K 9/00791 |
| 2019/0079539 | A1* | 3/2019 | Sridhar | G05D 1/0278 |
| 2019/0170511 | A1* | 6/2019 | Maucher | G01C 7/04 |
| 2020/0156618 | A1* | 5/2020 | Kook | B60W 10/11 |
| 2021/0331677 | A1* | 10/2021 | Kim | G06N 3/08 |

\* cited by examiner

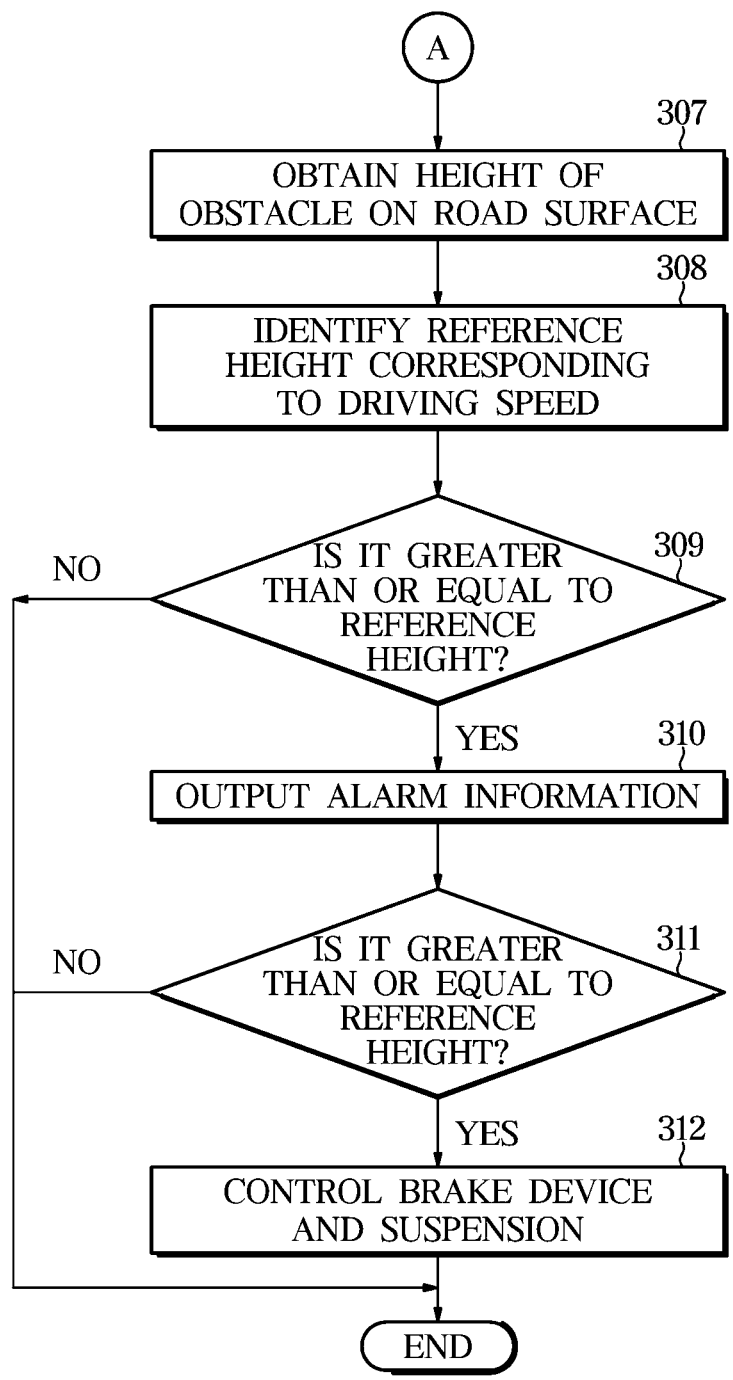

A      B      C

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0015865, filed on Feb. 12, 2019 in the Korean Intellectual Property Office, the disclosure of which is incorporated by reference in its entirety.

TECHNICAL FIELD

Embodiments of the disclosure relate to a vehicle for safely driving on a road where a speed bump and a pothole exist, and a method of controlling the vehicle.

BACKGROUND

In recent years, in order to prevent an accident caused by driver's carelessness, various advanced driver assistance systems (ADAS) have been developed to transmit driving information of a vehicle to the driver and to perform autonomous driving for driver's convenience.

Among the ADAS, Autonomous Emergency Braking (AEB), Blind Spot Detection (BSD), a Lane keeping Assistance System (LKAS) using a vision sensor have been utilized.

In addition, a navigation device has been utilized for the driver's convenience.

The navigation device is a device that receives position information from satellites through a number of Global Positioning Systems (GPSs), calculates a position of a current vehicle, displays by matching the calculated position to a map, performs a path search from a current position to a destination, display by matching the searched path to the map, and guiding a user to the destination along the path.

The navigation device may guide the presence and absence of the speed bump and a distance to the speed bump during vehicle driving.

However, in some cases, a position of the speed bump stored in the navigation device does not coincide with a position of an actual speed bump, and there may be a fake speed bump on a road, with only a bump is drawn without a predetermined height of the bump.

In other words, due to incorrect information on the speed bump, when passing the actual speed bump at high speed, there is a problem that the vehicle is damaged, there is a problem that a passenger of the vehicle is inconvenient. When passing the fake speed bump, there is a problem that the accident occurs due to sudden braking.

In addition to the speed bump, when passing through a pothole on the road, there is a problem that tires and wheels of the vehicle are damaged.

Therefore, there is a need for a study of a technology capable of recognizing a road condition accurately and a technology of outputting an alarm at an appropriate time.

SUMMARY

Therefore, it is an aspect of the disclosure to provide a vehicle capable of controlling a warning information output, a speed, and a suspension based on a change amount of vertical movement of another vehicle when a distance from another vehicle driving in front is less than or equal to a reference distance, and a method of controlling the vehicle.

It is another aspect of the disclosure to provide a vehicle capable of controlling the warning information output, the speed, and the suspension based on road information when the distance from another vehicle driving in front exceeds the reference distance, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes an image sensor disposed at the vehicle so as to have a field of view of the outside of the vehicle, configured to capture image data; a radar disposed at the vehicle so as to have a detecting area of the outside of the vehicle, configured to capture detecting data; a controller including at least one processor configured to process the image data and the detecting data. The controller may recognize a forward vehicle in response to the processing of the image data, obtain a distance from the forward vehicle in response to the processing of the detecting data, obtain a change amount of vertical movement of the forward vehicle in the image data in response to the distance from the forward vehicle that is equal to or less than a reference distance, and output deceleration guide information based on the change amount, and recognize a height of an obstacle on a road surface in the image data in response to the distance from the forward vehicle that exceeds the reference distance, and output the deceleration guide information based on the height of the obstacle on the road surface.

The vehicle may further include a speed detector configured to detect a driving speed of the vehicle; and a storage configured to store a reference height for each driving speed. The controller may identify the reference height corresponding to the driving speed of the vehicle from the storage, to obtain the height of the obstacle on the road surface corresponding to the change amount, and output the deceleration guide information when the height of the obstacle on the road surface is greater than or equal to the reference height.

The vehicle may further include a suspension provided adjacent to the front, rear, left, and right wheels of the vehicle; and a brake device configured to generate a braking force. When a predetermined time has elapsed from the time of outputting the deceleration guide information, the controller may identify the reference height corresponding to the driving speed again when the predetermined time has elapsed. When the obtained height of the obstacle on the road surface is greater than or equal to the identified reference height, the controller may control the operation of at least one of the suspension and the brake device.

When obtaining the change amount of the vertical movement of the forward vehicle, the controller may obtain the change amount of the left and right vertical movement of the forward vehicle, respectively. When the change amount of the left and right vertical movement of the forward vehicle is different, the controller may control the damping force of the left and right suspensions differently.

When obtaining the change amount of the vertical movement of the forward vehicle, the controller may obtain the change amount of the left and right vertical movement of the forward vehicle, respectively. When the change amount of the left and right vertical movement of the forward vehicle is different, the controller may control the operation of the suspension so that the left and right heights of the vehicle are different.

The vehicle may further include a speed detector configured to detect a driving speed of the vehicle; and a storage configured to store a reference height for each driving speed. The controller may identify the reference height corresponding to the driving speed of the vehicle from the storage, obtain the height of the obstacle on the road surface, and output the deceleration guide information when the obtained height of the obstacle on the road surface is greater than or equal to the reference height.

The vehicle may further include a suspension provided adjacent to the front, rear, left, and right wheels of the vehicle; and a brake device configured to generate a braking force. When a predetermined time has elapsed from the time of outputting the deceleration guide information, the controller may identify the reference height corresponding to the driving speed again when the predetermined time has elapsed. When the obtained height of the obstacle on the road surface is greater than or equal to the identified reference height, the controller may control the operation of at least one of the suspension and the brake device.

The vehicle may further include an outputter configured to output the deceleration guide information. The outputter may include at least one of a sound outputter configured to output a warning sound and a display configured to light an indicator.

In accordance with another aspect of the disclosure, a vehicle includes an image sensor disposed at the vehicle so as to have a field of view of the outside of the vehicle, configured to capture image data; a speed detector configured to detect a driving speed of the vehicle; a storage configured to store a reference height for each driving speed; and a controller including at least one processor configured to process the image data. The controller may obtain a change amount of vertical movement of a forward vehicle in response to the processing of the image data, and obtain a height of an obstacle on a road surface corresponding to the obtained change amount, and identify the reference height corresponding to the driving speed of the vehicle from the storage, and output deceleration guide information when the obtained height of the obstacle on the road surface is greater than or equal to the reference height.

The vehicle may further include a radar disposed at the vehicle so as to have a detecting area of the outside of the vehicle, configured to capture detecting data. The controller may recognize a height of an obstacle on the road surface in the image data in response to a distance from the forward vehicle that exceeds a reference distance, and recognize the height of the obstacle on the road surface based on the change amount of the vertical movement of the forward vehicle in response to the distance from the forward vehicle that is equal to or less than the reference distance.

The vehicle may further include a suspension provided adjacent to the front, rear, left, and right wheels of the vehicle; and a brake device configured to generate a braking force. When a predetermined time has elapsed from the time of outputting the deceleration guide information, the controller may identify the reference height corresponding to the driving speed again when the predetermined time has elapsed. When the obtained height of the obstacle on the road surface is greater than or equal to the identified reference height, the controller may control the operation of at least one of the suspension and the brake device.

When obtaining the change amount of the vertical movement of the forward vehicle, the controller may obtain the change amount of the left and right vertical movement of the forward vehicle, respectively. When the change amount of the left and right vertical movement of the forward vehicle is different, the controller may control the damping force of the left and right suspensions differently.

When obtaining the change amount of the vertical movement of the forward vehicle, the controller may obtain the change amount of the left and right vertical movement of the forward vehicle, respectively. When the change amount of the left and right vertical movement of the forward vehicle is different, the controller may control the operation of the suspension so that the left and right heights of the vehicle are different.

In accordance with another aspect of the disclosure, a method of controlling a vehicle includes recognizing a forward vehicle in response to the processing of image data captured by an image sensor disposed at the vehicle so as to have a field of view of the outside of the vehicle; obtaining a distance from the forward vehicle in response to the processing of detecting data captured by a radar disposed at the vehicle so as to have a detecting area of the outside of the vehicle; obtaining a change amount of vertical movement of the forward vehicle in the image data in response to the distance from the forward vehicle that is equal to or less than a reference distance; obtaining a height of an obstacle on a road surface corresponding to the change amount; obtaining the height of the obstacle on the road surface in the image data in response to the distance from the forward vehicle that exceeds the reference distance; identifying a driving speed of the vehicle; identifying a reference height corresponding to the driving speed of the vehicle; and outputting deceleration guide information in response to the height of the obstacle on the road surface that is greater than or equal to the reference height.

The method may further include when a predetermined time has elapsed from the time of outputting the deceleration guide information, identifying the reference height corresponding to the driving speed again when the predetermined time has elapsed; when the obtained height of the obstacle on the road surface is less than the identified reference height, stopping output of alarm information; and when the obtained height of the obstacle on the road surface is greater than or equal to the identified reference height, controlling the operation of at least one of the suspension and the brake device.

The obtaining of the change amount of vertical movement of the forward vehicle may include obtaining the change amount of the left and right vertical movement of the forward vehicle, respectively; and when the change amount of the left and right vertical movement of the forward vehicle is different, operating the left and right suspensions so that the damping force of the left and right suspensions are different.

The obtaining of the change amount of vertical movement of the forward vehicle may include obtaining the change amount of the left and right vertical movement of the forward vehicle, respectively; and when the change amount of the left and right vertical movement of the forward vehicle is different, controlling the operation of the suspension so that the left and right heights of the vehicle are different.

The outputting of the alarm information may include outputting a warning sound for guiding a deceleration or lighting an indicator.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6A and 6B are control flowcharts of a vehicle according to exemplary embodiments of the disclosure.

DETAILED DESCRIPTION

Figure 1:
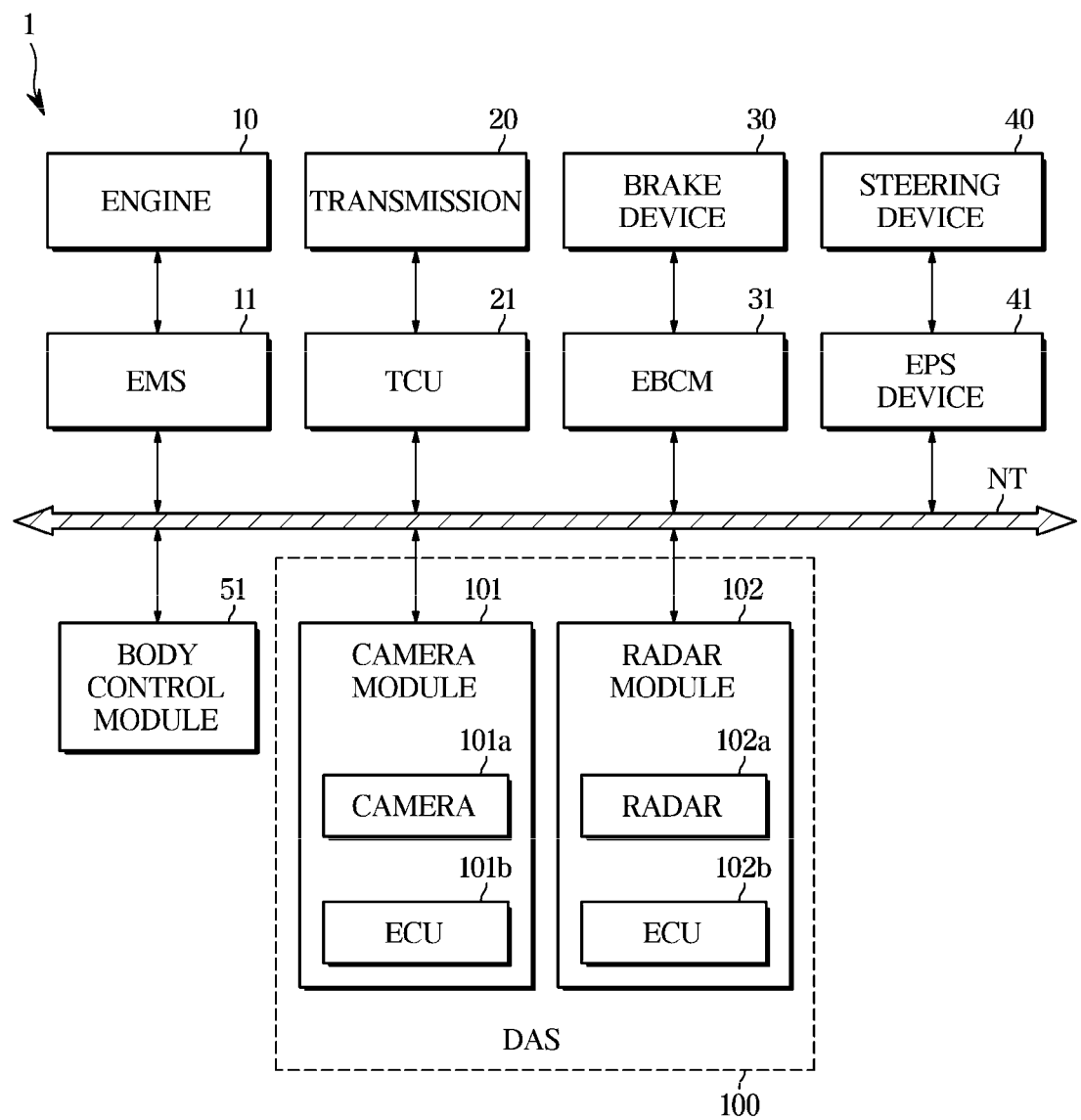
FIG. 1 is a block diagram illustrating components of a vehicle according to exemplary embodiments of the disclosure.

Like reference numerals refer to like elements throughout the specification. Not all elements of exemplary embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and exemplary embodiments of the disclosure will now be described with reference to the accompanying drawings.

FIG. 1 is a block diagram illustrating components of a vehicle according to exemplary embodiments of the disclosure.

As illustrated in FIG. 1, a vehicle 1 may include an engine 10, a transmission 20, a brake device 30, and a steering device 40.

The engine 10 may include at least one cylinder and at least one piston, and may generate power needed to drive the vehicle 1.

The transmission 20 may include a plurality of gears, and may transmit power generated by the engine 10 to wheels of the vehicle 1.

The brake device 30 may decelerate or stop the vehicle 1 through frictional force on wheels. The brake device 30 may include one or more brake pads and brake shoes operative to decelerate or stop the vehicle.

The steering device 40 may change a driving direction of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a Driver Assistance System (DAS) 100.

The EMS 11 may control the engine 10 in response to either the driver's acceleration intention from the acceleration pedal or a request signal from the DAS 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The EBCM 31 may control a brake device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

The EPS device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The DAS 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., vehicle itself), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to obtain image data of a peripheral area of the vehicle 1 (e.g., a area outside of and surrounding the vehicle 1), and a radar module 102 operative to obtain data about a peripheral object present in the peripheral area of the vehicle 1.

The camera module 101 may include a camera 101a or multiple cameras and an Electronic Control Unit (ECU) controller 101b. The camera 101a may capture an image including a forward area of the vehicle 1 (e.g., a area in front of the vehicle 1), and may include an image processor operative to process the captured image to recognize peripheral vehicles, pedestrians, cyclists, lanes, traffic signs, or the like in the captured image.

The radar module 102 may include a radar 102a or multiple radars and an Electronic Control Unit (ECU) controller 102b, and may obtain or determine a relative position, a relative speed, or the like of the peripheral object (e.g., a peripheral vehicle, a pedestrian, or a cyclist) of the vehicle 1 based on sensed radar data.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

Figure 2:
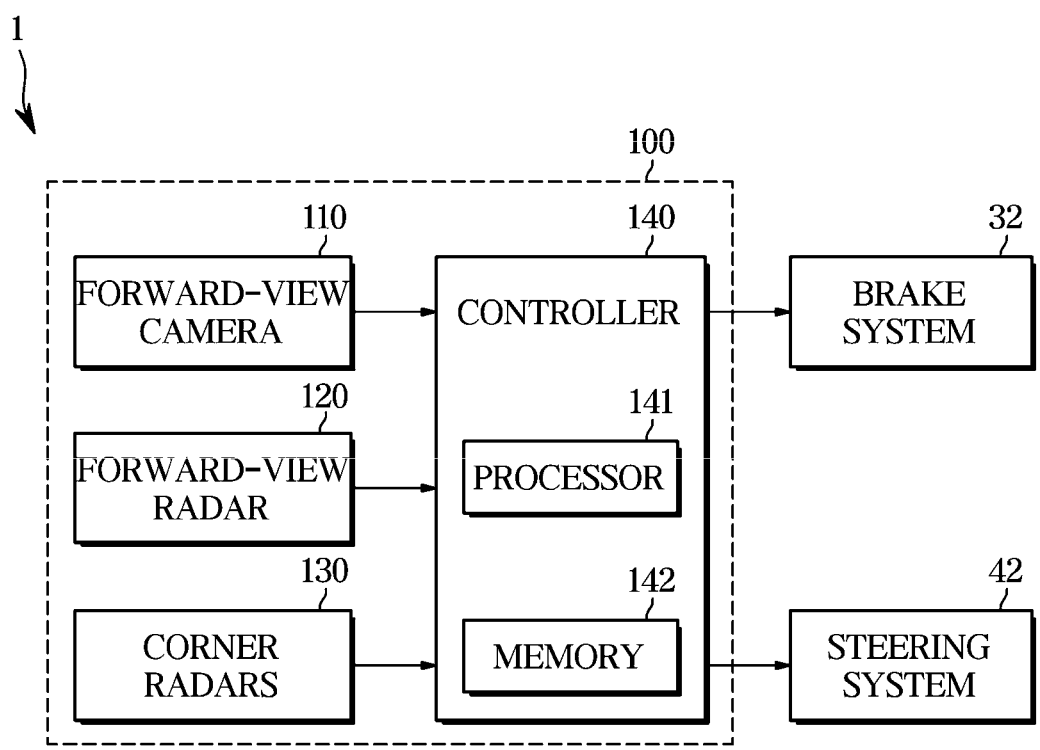
FIG. 2 is a block diagram illustrating a driver assistance system according to exemplary embodiments of the disclosure.
Figure 3:
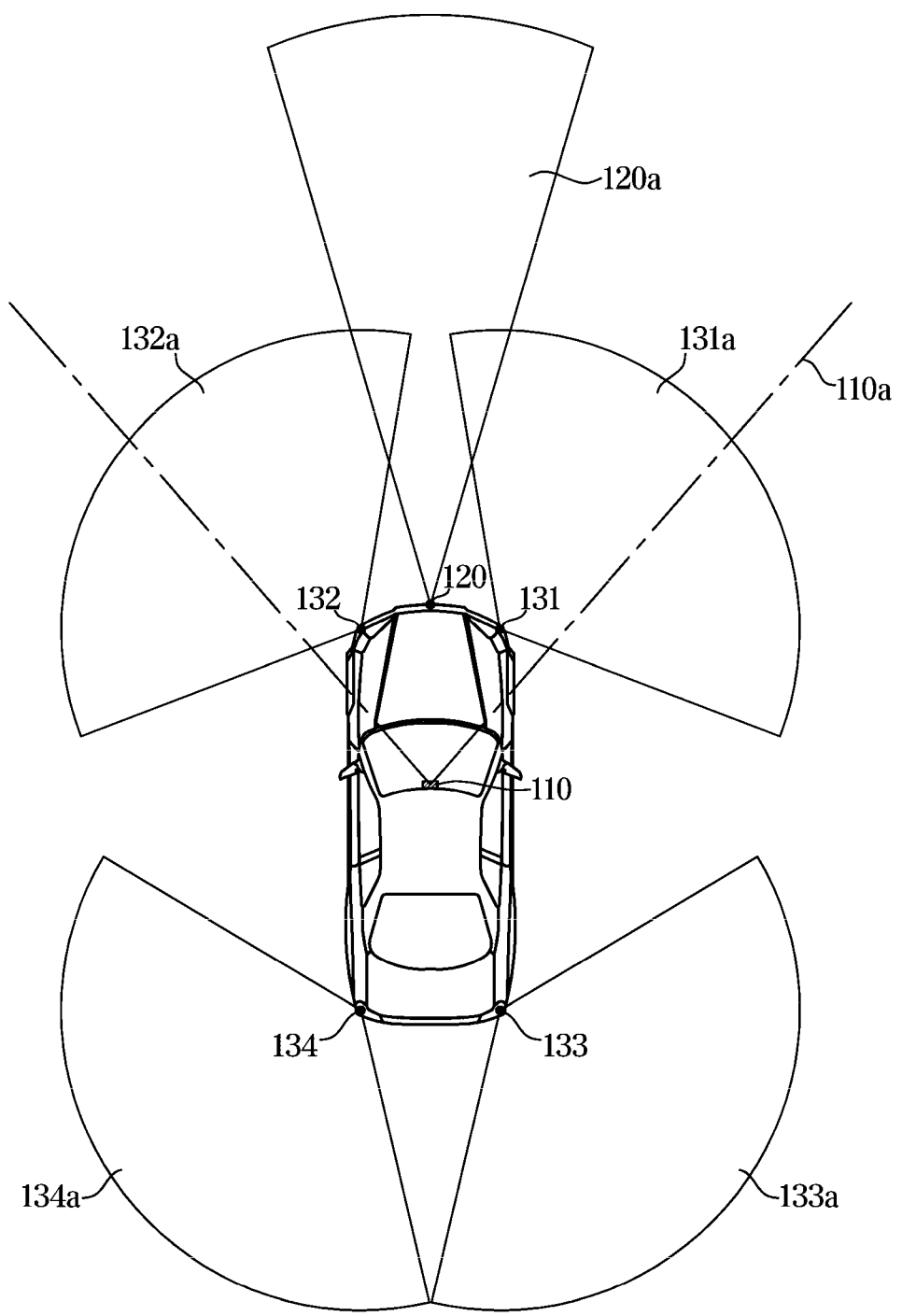
FIG. 3 is an exemplary view illustrating detecting ranges of a camera and a radar device for use in a driver assistance system according to exemplary embodiments of the disclosure.

FIG. 2 is a block diagram illustrating a driver assistance system according to exemplary embodiments of the disclosure, and FIG. 3 is an exemplary view illustrating detecting ranges of a camera and a radar device for use in a driver assistance system according to exemplary embodiments of the disclosure.

As illustrated in FIG. 2, the vehicle 1 may include a brake system 32, a steering system 42, and a driver assistance system (DAS) 100.

The brake system 32 may include the Electronic Brake Controller or Electronic Brake Control Module (EBCM) 31 (see FIG. 1) and the brake device 30 (see FIG. 1). The steering system 42 may include the Electronic Power Steering (EPS) device 41 (see FIG. 1) and the steering device 40 (see FIG. 1).

The DAS 100 may include one or more of a forward-view camera 110, a forward-view radar 120, and a plurality of corner radars 130.

As illustrated in FIG. 3, the forward-view camera 110 may include a Field of View (FOV) 110a oriented to the forward area of the vehicle 1. The forward-view camera 110 may be installed at a windshield of the vehicle 1.

The forward-view camera 110 may capture an image of the forward area of the vehicle 1, and may obtain data of the forward-view image of the vehicle 1. The forward-view image data of the vehicle 1 may include information about the position of a peripheral vehicle, a pedestrian, a cyclist, or a lane located in the forward area of the vehicle 1.

The forward-view camera 110 may include a plurality of lenses and a plurality of image sensors. Each image sensor may include a plurality of photodiodes to convert light into electrical signals, and the photodiodes may be arranged in a two-dimensional (2D) matrix.

The forward-view camera 110 may be electrically coupled to the processor or a first controller 140. For example, the forward-view camera 110 may be connected to the first controller 140 through a vehicle communication network (NT), Hardwires, or a Printed Circuit Board (PCB).

The forward-view camera 110 may transmit the forward-view image data of the vehicle 1 to the first controller 140.

As illustrated in FIG. 3, the forward-view radar 120 may include a Field of Sensing (FOS) 120a oriented to the forward area of the vehicle 1. The forward-view radar 120 may be mounted to, for example, a grille or a bumper of the vehicle 1.

The forward-view radar 120 may include a transmission (Tx) antenna (or a transmission (Tx) antenna array) to emit transmission (Tx) waves to the forward area of the vehicle 1 and a reception (Rx) antenna (or a reception (Rx) antenna array) to receive waves reflected from any object located in the FOS.

The forward-view radar 120 may obtain forward-view radar data not only from Tx waves received from the Tx antenna, but also from reflected waves received from the Rx antenna.

The forward-view radar data may include not only information about a distance between the vehicle 1 and a peripheral vehicle (or a pedestrian or cyclist or other preceding object) located in the forward area of the vehicle 1, but also information about a speed of the peripheral vehicle, the pedestrian, or the cyclist.

The forward-view radar 120 may calculate a relative distance between the vehicle 1 and any object based on a difference in phase (or difference in time) between Tx waves and reflected waves, and may calculate a relative speed of the object based on a difference in frequency between the Tx waves and the reflected waves.

For example, the forward-view radar 120 may be coupled to the first controller 140 through a vehicle communication network (NT), Hardwires, or a PCB. The forward-view radar 120 may transmit forward-view radar data to the first controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

As illustrated in FIG. 3, the first corner radar 131 may include a field of sensing (FOS) 131a oriented to a forward right area of the vehicle 1. For example, the forward-view radar 120 may be mounted to a right side of a front bumper of the vehicle 1. The second corner radar 132 may include an FOS 132a oriented to a forward left area of the vehicle 1, and may be mounted to, for example, a left side of the front bumper of the vehicle 1. The third corner radar 133 may include an FOS 133a oriented to a rear right area of the vehicle 1, and may be mounted to, for example, a right side of a rear bumper of the vehicle 1. The fourth corner radar 134 may include an FOS 134a oriented to a rear left area of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna.

The first, second, third, and fourth corner radars 131, 132, 133, and 134 may respectively obtain first corner radar data, second corner radar data, third corner radar data, and fourth corner radar data.

The first corner radar data may include information about a distance between the vehicle 1 and the object (e.g., a peripheral vehicle, a pedestrian, or a cyclist) present in a forward right area of the vehicle 1, and information about a speed of the object. The second corner radar data may include information about a distance between the vehicle 1 and an object (e.g., a peripheral vehicle, a pedestrian, or a cyclist) present in a forward left area of the vehicle 1, and information about a speed of the object. The third corner radar data may include information about a distance between the vehicle 1 and an object (e.g., a peripheral vehicle, a pedestrian, or a cyclist) present in a rear right area of the vehicle 1, and information about a speed of the object. The fourth corner radar data may include information about a distance between the vehicle 1 and an object (e.g., a peripheral vehicle, a pedestrian, or a cyclist) present in a rear left area of the vehicle 1, and information about a speed of the object.

Each of the first, second, third, and fourth corner radars 131, 132, 133, and 134 may be connected to the first controller 140 through, for example, a vehicle communication network NT, Hardwires, or a PCB. The first, second, third, and fourth corner radars 131, 132, 133, and 134 may respectively transmit first corner radar data, second corner radar data, third corner radar data, and fourth corner radar data to the first controller 140.

The first controller 140 may include a controller (ECU) 101b (see FIG. 1) of the camera module 101 (see FIG. 1), a controller (ECU) 102b (see FIG. 2) of the radar module 102 (see FIG. 1), and/or an additional integrated controller.

The first controller 140 may include a processor 141 and a memory 142.

The processor 141 may process forward-view image data of the forward-view camera 110, forward-view radar data of the forward-view radar 120, and corner radar data of the plurality of corner radars 130, and may generate a brake signal controlling the brake system 32 and a steering signal controlling the steering system 42.

For example, the processor 141 may include an image processor to process the forward-view image data of the forward-view camera 110, a digital signal processor to process radar data detected by the radars 120 and 130, and/or a Micro-Control Unit (MCU) to generate a brake signal and a steering signal.

The processor 141 may detect the presence or absence of a preceding object (e.g., a peripheral vehicle, a pedestrian, a cyclist, or the like) in the forward area of the vehicle 1 based on the forward-view image data of the forward-view camera 110 and the forward-view radar data of the forward-view radar 120.

In more detail, the processor 141 may obtain the position information (distance and direction) of each preceding object of the vehicle 1 and speed information about a relative speed of each preceding object. The processor 141 may obtain information about the position (direction) and type (e.g., a peripheral vehicle, a pedestrian or a cyclist) of each preceding object of the vehicle 1 upon receiving the forward-view image data from the forward-view camera 110.

In addition, the processor 141 may match the objects detected by the forward-view image data to objects detected by the forward-view radar data, respectively. The processor 141 may obtain information about the type (e.g., vehicle, pedestrian, cyclist, or other unclassified object), the position information, and the speed information of each preceding object of the vehicle 1.

The processor 141 may generate a brake signal and a steering signal based on the type information of each preceding object and the position information and the speed information of each preceding object.

For example, the processor 141 may calculate a Time-to-Collision (TTC) between the vehicle 1 and the preceding object based on the position information (distance) and the speed information (relative speed) of each preceding object, may compare the calculated TTC with a predetermined reference time, and may warn the driver about a high possibility of collision with the preceding object or may transmit a brake signal to the brake system 32.

In response to a TTC shorter than a first reference time, the processor 141 may control an audio device and/or a display to output a warning message.

In response to a TTC shorter than a second reference time, the processor 141 may transmit a prior braking signal to the brake system 32.

In response to a TTC shorter than a third reference time, the processor 141 may transmit an emergency braking signal to the brake system 32. In this case, the second reference time may be shorter than the first reference time, and the third reference time may be shorter than the second reference time.

In another example, the processor 141 may calculate a Distance-to-Collision (DTC) based on the speed information of each preceding object, and may warn the driver about a high possibility of collision with the preceding object or may transmit a brake signal to the brake system 32 according to the result of comparison between the calculated DTC and the distance to each preceding object.

The processor 141 may obtain information about the position information (distance and direction) and the speed information (relative speed) of each side object (e.g., a forward right object, a forward left object, a rear right object, or a rear left object) located in the side area of the vehicle 1 based on corner radar data received from the corner radars 130.

The memory 142 may store programs and/or data needed for allowing the processor 141 to process image data, may store programs and/or data needed for the processor 141 to process radar data, and may store programs and/or data needed for the processor 141 to generate a brake signal and/or a steering signal.

The memory 142 may temporarily store image data received from the forward-view camera 110 and/or radar data received from the radars 120 and 130, and may also temporarily store the processed results of the image data and/or the radar data handled by the processor 141.

Figure 4:
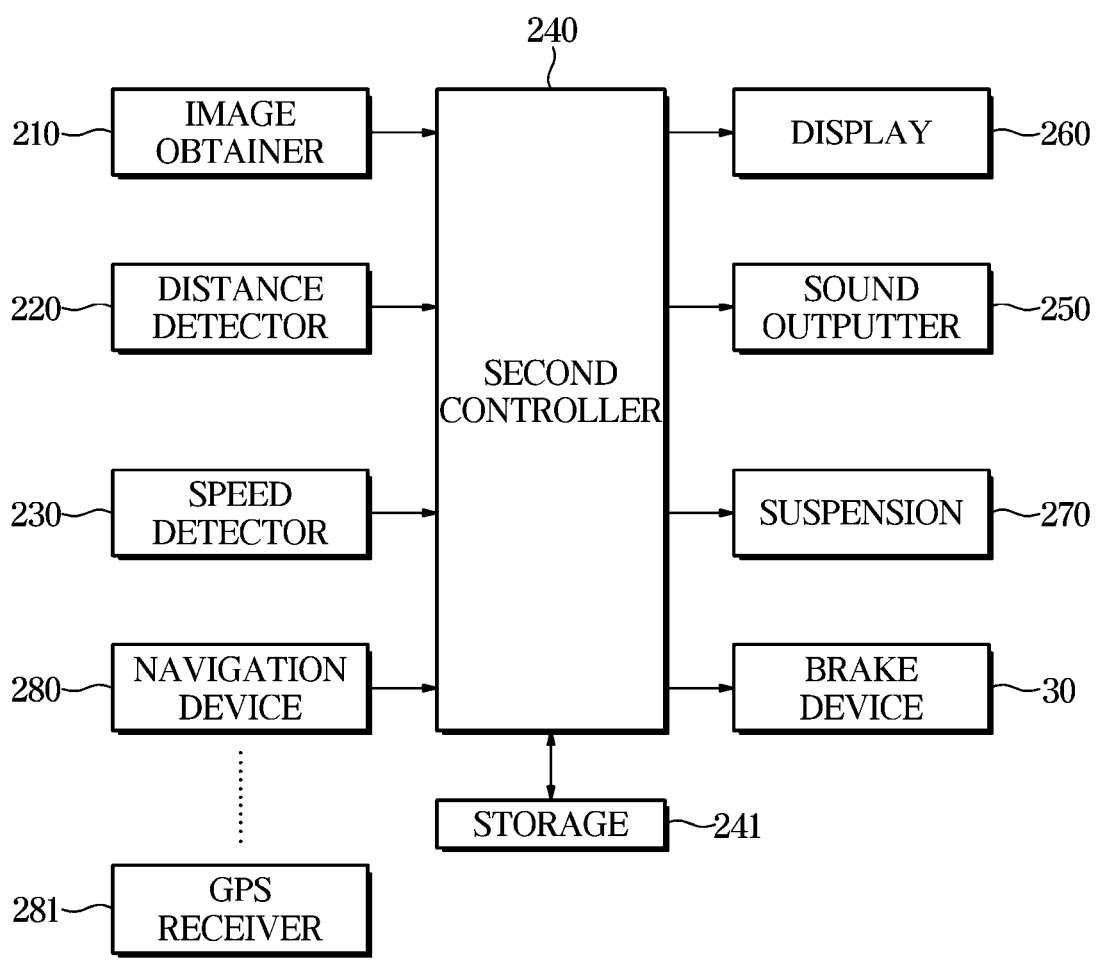
FIG. 4 is a control block diagram of a vehicle according to exemplary embodiments of the disclosure.

The memory 142 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM), FIG. 4 is a control block diagram of a vehicle according to exemplary embodiments of the disclosure.

The vehicle 1 may include an alarm and safety control apparatus 200 as the DAS 100.

The alarm and safety control apparatus 200 may directly or indirectly recognize a road condition, determine a risk level for the recognized road condition, and output alarm information or perform safety control based on the determined risk level.

The alarm and safety control apparatus 200 of the vehicle 1 may include an image obtainer 210, a distance detector 220, a speed detector 230, a second controller 240, a storage 241, a sound outputter 250, and a display 260. The alarm and safety control apparatus 200 may include the brake device 30 and a suspension 270 for safety control, and may further include a navigation device 280 and a GPS receiver 281 to recognize the road condition.

The alarm and safety control apparatus 200 may communicate with the brake device 30 and the suspension 270 to transmit a control command to at least one of the brake device 30 and the suspension 270, and may the navigation device 280 to receive road information from the navigation device 280.

The image obtainer 210 may obtain an image of a road and transmit information of the obtained image to the second controller 240. The information of the image may be image data.

The image obtainer 210 may include the forward-view camera 110 and may obtain image information of the road from the forward-view image data captured by the forward-view camera 110.

The distance detector 220 may detect another vehicle of the forward area the vehicle itself and transmit distance information about the detected distance to the other vehicle to the second controller 240.

The distance detector 220 may include the forward-view radar 120.

In addition, the distance detector 220 may also include a Light Detection And Ranging (LiDAR) sensor.

The LiDAR sensor is a contactless distance detection sensor using a principle of laser radar.

The LiDAR sensor may include a transmitter for transmitting a laser and a receiver for receiving the laser reflected from a surface of the object existing within a sensor range.

Here, the laser may be a single laser pulse.

Since the LiDAR sensor has higher detection accuracy in a lateral direction than a Radar Detecting And Ranging (RaDAR) sensor, it can improve the accuracy of the process of determining whether there is a passage in front.

The distance detector 220 may include an ultrasonic sensor.

The ultrasonic sensor may generate an ultrasonic wave for a predetermined time and then detect the signal reflected from the object.

The ultrasonic sensor may be used to determine the presence or absence of obstacles such as pedestrians within a short range.

The speed detector 230 detects the driving speed of the vehicle 1. The driving speed may be a vehicle speed.

The speed detector 230 may include wheel speed sensors provided on the front, rear, left, and right wheels, may include an acceleration sensor for detecting an acceleration of the vehicle 1, and may include both the wheel speed sensor and the acceleration sensor.

The vehicle may further include an inputter (not shown) for receiving operation information on at least one mode or function.

The inputter may select a beep for deceleration among a plurality of beeps.

When the image information of the road is received, the second controller 240 may perform image processing to recognize another vehicle driving in front of the vehicle itself, and may obtain the distance from another vehicle recognized based on detection information detected by the distance detector 220. Here, the other vehicle driving in front of the vehicle itself may be another vehicle driving in the same lane as the vehicle itself.

The second controller 240 compares the obtained distance with another vehicle and a reference distance, and when the distance from another vehicle is less than or equal to the reference distance, the second controller 240 may obtain a vertical change amount corresponding to vertical movement of another vehicle based on the image of another vehicle in the obtained image. When it is determined that the obtained vertical change amount is greater than or equal to a reference change amount, the second controller 240 may control at least one of the display 260 and the sound outputter 250 to output the alarm information.

In other words, the second controller 240 may indirectly recognize the road condition of the road through the movement of another vehicle.

The second controller 240 may identify the driving speed when it is determined that the vertical change amount of another vehicle is greater than or equal to the reference change amount, and when it is determined that the identified driving speed is equal to or more than a reference speed, the second controller 240 may control at least one of the display 260 and the sound outputter 250 to output the alarm information.

The second controller 240 may identify the driving speed again when a predetermined time elapses from a start point of output of the alarm information, and when it is determined that the identified driving speed is less than the reference speed, the second controller 240 may stop the output of the alarm information. When it is determined that the identified driving speed is equal to or more than a reference speed, the second controller 240 may control the operation of at least one of the suspension 270 and the brake device 30.

When it is determined that the vehicle 1 has moved by a predetermined distance from the start point of output of the alarm information, the second controller 240 may identify the driving speed. When it is determined that the identified driving speed is less than the reference speed, the second controller 240 may stop the output of the alarm information. When it is determined that the identified driving speed is equal to or more than a reference speed, the second controller 240 may control the operation of at least one of the suspension 270 and the brake device 30.

When the distance from another vehicle is less than or equal to the reference distance, the second controller 240 may obtain the vertical change amount corresponding to vertical movement of another vehicle based on the image of another vehicle in the obtained image. When it is determined that the obtained vertical change amount is greater than or equal to the reference change amount, the second controller 240 may obtain a height of the obstacle existing on the road corresponding to the vertical change amount of another vehicle and obtain a reference height corresponding to the driving speed. When the height of the obtained obstacle is greater than or equal to the reference height, the second controller 240 may control at least one of the display 260 and the sound outputter 250.

When the predetermined time has elapsed or the predetermined distance has driven since the alarm information is output, the second controller 240 may obtain the reference height corresponding to the driving speed again. When the height of the obtained obstacle is equal to or higher than the obtained reference height, the second controller 240 may control at least one of the suspension 270 and the brake device 30.

When the distance from another vehicle is less than or equal to the reference distance, the second controller 240 may obtain the vertical change amount corresponding to vertical movement of another vehicle based on the image of another vehicle in the obtained image. When it is determined that the obtained vertical change amount is greater than or equal to the reference change amount, the second controller

240 may obtain the height of the obstacle existing on the road corresponding to the vertical change amount of another vehicle and obtain an impact value corresponding to the obtained height of the obstacle and the driving speed. When the obtained impact value is outside an impact threshold value and exists in a control area, the second controller 240 may control at least one of the display 260 and the sound outputter 250 to output the alarm information.

When the predetermined time has elapsed or the predetermined distance has driven since the alarm information is output, the second controller 240 may identify the driving speed again and obtain the impact value corresponding to the identified driving speed and the height of the obtained obstacle. When the obtained impact value is outside the impact threshold value and exists in the control area, the second controller 240 may control at least one of the suspension 270 and the brake device 30.

When the distance from another vehicle is less than or equal to the reference distance, the second controller 240 may obtain the vertical change amount corresponding to vertical movement of another vehicle based on the image of another vehicle in the obtained image. When it is determined that the obtained vertical change amount is greater than or equal to the reference change amount, the second controller 240 may obtain the height of the obstacle existing on the road corresponding to the vertical change amount of another vehicle and identify the reference speed corresponding to the obtained height of the obstacle. When the driving speed is faster than the reference speed, the second controller 240 may control at least one of the display 260 and the sound outputter 250 to output the alarm information.

When the predetermined time has elapsed or the predetermined distance has driven since the alarm information is output, the second controller 240 may identify the driving speed again. When the identified driving speed is faster than the reference speed, the second controller 240 may control at least one of the suspension 270 and the brake device 30.

When it is determined that the vertical movement of another vehicle driving in the front occurs only on the left side or the right side, the second controller 240 may control the operation of the left and right suspension of a vehicle body differently. When it is determined that the vertical movement of another vehicle driving in the front occurred on both the left and right sides, the second controller 240 may control the operation of the left and right suspension of the vehicle body in the same manner.

When controlling the operation of the left and right suspensions differently, the second controller 240 may control the left and right heights of the vehicle differently, or control a damping force of the left and right suspensions differently.

When it is determined that an initial movement of the left side of a forward vehicle has changed from the lower side to the upper side when the amount of change of the vertical movement of the left side of another vehicle driving in front is greater than or equal to the reference change amount, the second controller 240 may determine that a pothole exists on the road and control the operation of the suspension 270 to decrease the right height of the vehicle and to increase the left height of the vehicle in order to prevent the vehicle itself from being tilted to the left side by the pothole.

When it is determined that an initial movement of the left side of the forward vehicle has changed from the upper side to the lower side when the amount of change of the vertical movement of the left side of another vehicle driving in front is greater than or equal to the reference change amount, the second controller 240 may determine that there is a speed bump on the left side of the road and control the operation of the suspension 270 to decrease the left height of the vehicle and to increase the right height of the vehicle in order to prevent the vehicle itself from being tilted to the right side by the speed bump.

The second controller 240 may control the damping force of the left and right suspension so that the damping force of the left suspension becomes higher than the damping force of the right suspension when the amount of change in the vertical movement of the left side of the another vehicle driving in front is greater than the reference change amount.

The second controller 240 may recognize the pothole or the speed bump in the image obtained by the image obtainer 210 when the distance from another vehicle driving in front of the vehicle 1 exceeds the reference distance.

The second controller 240 may directly recognize the road condition.

The second controller 240 may recognize the road condition directly or indirectly through the movement of another vehicle and the road image obtained from the image obtainer 210.

The second controller 240 may identify the driving speed when the pothole or the speed bump is recognized in the image obtained by the image obtainer 210 and control at least one of the display 260 and the sound outputter 250 to output the alarm information when the determined driving speed is greater than or equal to the reference speed.

The second controller 240 may recognize the road condition of a lane itself based on the distance information with the road surface detected by the forward-view radar 120 and the distance information between the road surface of the road detected by the first and second corner radar 131 and the second corner radar 132.

In other words, the second controller 240 may directly recognize the road condition of the road through at least one of the image obtainer 210 and the distance detector 220.

When the position information of the speed bump is received from the navigation device 280, the second controller 240 may identify the driving speed of the vehicle itself. When it is determined that the determined driving speed is greater than or equal to the reference speed, the second controller 240 may control at least one of the display 260 and the sound outputters 250 to output the alarm information.

The second controller 240 may obtain the distance from the speed bump based on the position information of the speed bump and the position information of the current vehicle. When the distance from the speed bump is less than or equal to the reference distance, the second controller 240 may identify the driving speed again. When it is determined that the identified driving speed is less than the reference speed, the second controller 240 may stop the output of the alarm information. When it is determined that the identified driving speed is greater than or equal to the reference speed, the second controller 240 may control the operation of at least one of the suspension 270 and the brake device 30.

The second controller 240 may control the brake device 30 based on the road condition of the road so that the driving speed is decreased by a braking force.

The second controller 240 may control the engine 10 to decrease the driving speed of the vehicle 1 based on the road condition of the road. In other words, the second controller 240 may control the engine 10 to decrease a rotation speed of the engine 10.

As such, the second controller 240 may control the operation of the suspension 270 to adjust the damping force of the suspension 270 based on the road condition of the road.

In other words, the second controller 240 may control the suspension 270 to increase the damping force of the damper when the road condition of the road is irregular due to the pothole or the speed bump.

In addition, the second controller 240 may control the operation of at least one of the suspension 270 and the brake device 30 before passing through the pothole or the speed bump.

The second controller 240 may transmit a brake control command and a suspension control command to the brake device 30 and the suspension 270 through communication, and may transmit a driving speed control command to an engine management system 11 through communication.

Here, the second controller 240 of the alarm and safety control apparatus 200 may be the same as or different from the first controller 140 of the DAS 100.

The storage 241 may store the reference change amount, the reference speed, and the reference distance.

Here, the reference change amount, the reference speed, and the reference distance may be information obtained by experiments, respectively.

The storage 241 may store at least one of the predetermined time and the predetermined distance for stopping the alarm output.

Figure 5:
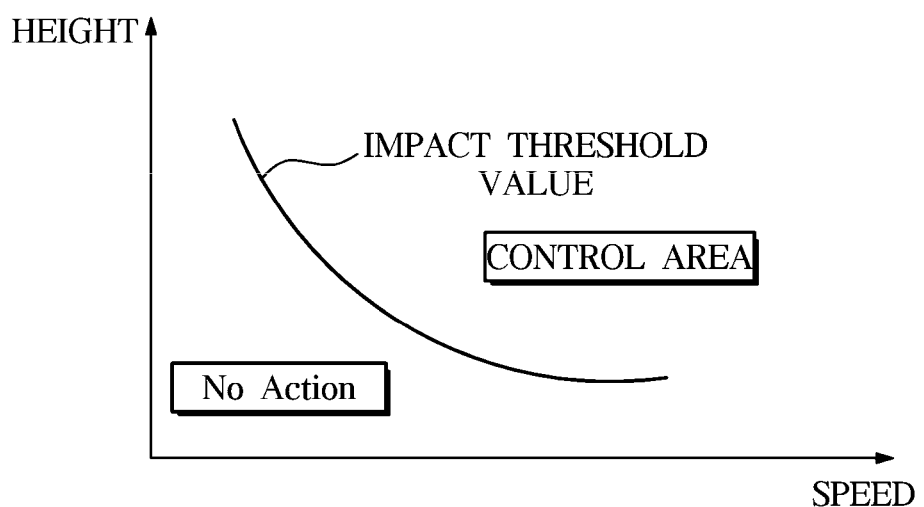
FIG. 5 is a graph illustrating an impact threshold value corresponding to a height of an obstacle stored in a vehicle and a driving speed of the vehicle according to exemplary embodiments of the disclosure.

As illustrated in FIG. 5, the storage 241 may store the impact threshold value corresponding to the height of the obstacle and the driving speed of the road surface such as the speed bump or the pothole. Here, the impact threshold value is a value that can impact the vehicle itself, and may be a preset value obtained by an experiment.

The storage 241 may store the reference height of the obstacle corresponding to the driving speed.

The reference height of the obstacle corresponding to the driving speed may be set by the graph illustrated in FIG. 5. In other words, the reference height of the obstacle corresponding to the driving speed may be a height corresponding to the impact threshold value matched with the driving speed, and the height that does not impact the driving vehicle may be set as the reference height.

The storage 241 may be implemented with at least one of a non-volatile memory device, such as a cache, Read Only Memory (ROM), Programmable ROM (PROM), Erasable Programmable ROM (EPROM), and Electrically Erasable Programmable ROM (EEPROM), a volatile memory device, such as Random Access Memory (RAM), or a storage medium, such as Hard Disk Drive (HDD) and Compact Disk (CD) ROM, without being limited thereto.

The storage 241 may be a memory implemented in a chip separate from the processor described above in connection with the first controller 240, and may be implemented as a single chip with the processor.

The vehicle 1 may include an outputter configured to output the alarm information in response to the control command, and the outputter may include at least one of the sound outputter 250 and the display 260. In this case, the alarm information may be deceleration guidance information indicating a decrease in the driving speed of the vehicle 1.

The sound outputter 250 may output the sound in response to the control command of the second controller 240.

The sound outputter 250 may output a warning sound for any one of the pothole and the speed bump. The sound outputter 250 may be a speaker.

The display 260 may display the image or turn on and off the image in response to the control command of the second controller 240.

The display 260 may display warning information about any one of the pothole and the speed bump. The display 260 may be a lamp such as an LED or a flat panel display such as an LCD.

The suspension 270 is a device for fixing the wheel to a chassis of the vehicle 1, to mitigate the impact and vibration from the road surface.

The suspension 270 may protect the vehicle body by increasing the height of the vehicle 1 on a bumpy road, and may increase the driving stability by reducing resistance of an air by decreasing the height of the vehicle 1 on a road capable of high-speed driving such as a highway.

The suspension 270 may include a chassis spring for mitigating the impact from the road surface, and a shock absorber for attenuating control of free vibration of the chassis spring to improve ride comfort. In other words, the shock absorber may be a shock absorber of an air suspension.

The suspension 270 may increase the damping force of the damper during rough road driving, rapid cornering, and a passage of the speed bump, and lower the damping force of the damper when the road surface is regular.

The suspension 270 may increase the damping force very high when the road surface is very irregular and slow, and slightly increase the damping force when the road is somewhat irregular and fast, and does not lower the damping force when the road surface is regular and slow.

In addition, the suspension 270 may increase the damping force when the driving speed is fast, decrease the damping force when the driving speed is slow, increase the damping force on a curved road, and decrease the damping force on a straight road. The suspension 270 may decrease the damping force of a front damper and increase the damping force of a rear damper during an understeering. The suspension 270 may increase the damping force of a front damper and decrease the damping force of a rear damper during an oversteering.

The suspension 270 may give a hard feeling to the driver when increasing the damping force of the damper, and may give a soft feeling to the driver when decreasing the damping force of the damper.

The navigation device 280 may include an inputter, a storage, a communicator, and a display. When a selection signal of a selected navigation mode is received through the inputter, the navigation device 280 may identify the current position received by the GPS receiver 281, identify a selected destination through the inputter, identify map information stored in the storage, search the path from the current position to the destination, match the searched path to the map, and display the map matching the path through the display.

When it is determined that the speed bump exists within a predetermined distance while the vehicle 1 is driving, the navigation device 280 may identify the position information of the speed bump and transmit the identified position information of the speed bump to the second controller 240.

When it is determined that the pothole exists within the predetermined distance while the vehicle 1 is driving, the navigation device 280 may identify the position information of the pothole and transmit the identified position information of the pothole to the second controller 240.

The GPS receiver 281 may receive the position of the vehicle itself. The GPS receiver 281 may communicate with a plurality of satellites to calculate the position of the vehicle itself.

Figure 6A:
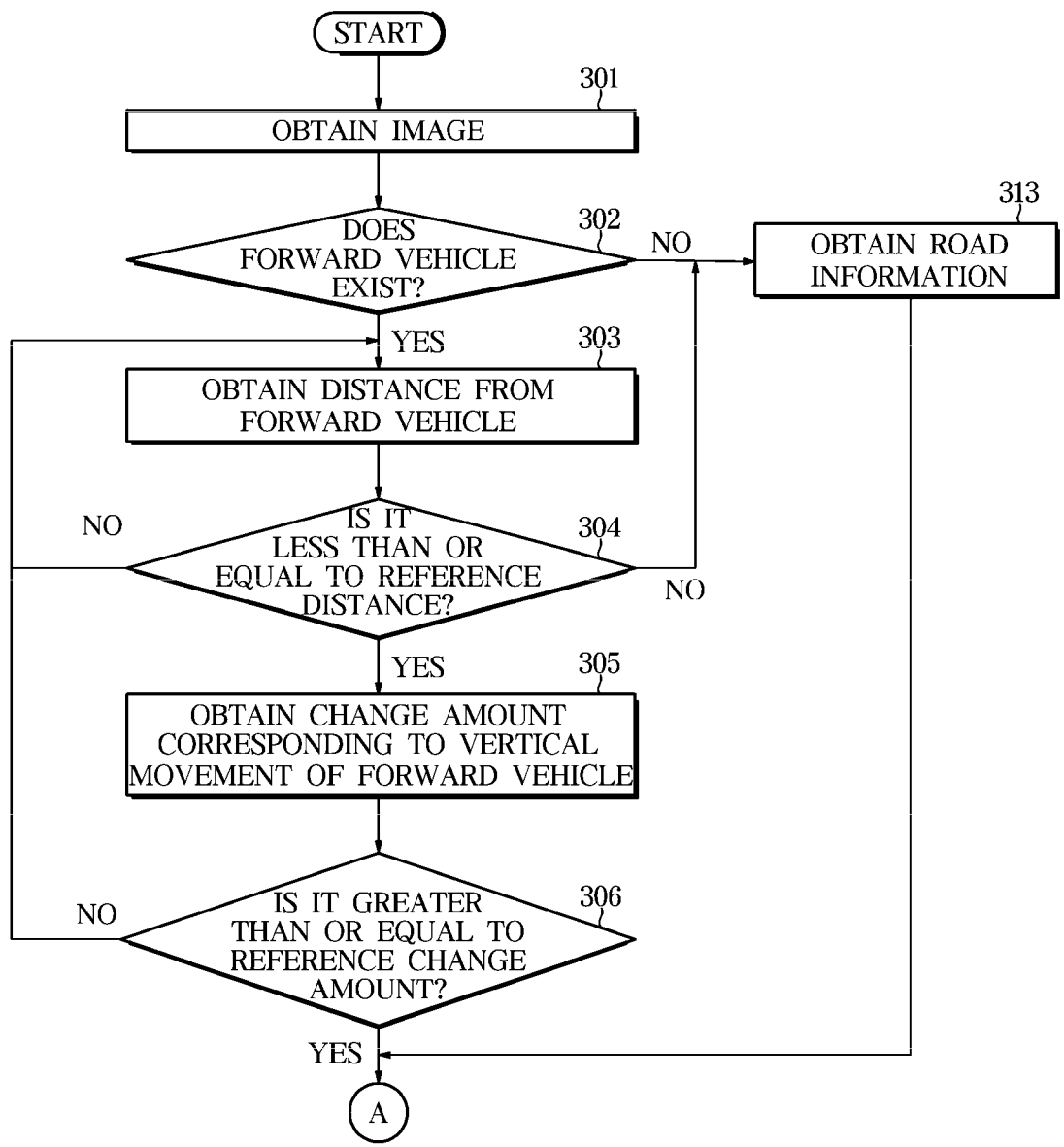

FIGS. 6A and 6B are control flowcharts of a vehicle according to exemplary embodiments of the disclosure, which will be described with reference to FIGS. 7, 8A, 8B, 8C, 9, 10A, 10B and 10C.

FIGS. 7, 8A, 8B, 8C, 9, 10A, 10B and 10C are exemplary views illustrating road condition recognition of a vehicle and height obtainment of an obstacle according to an exemplary embodiment.

The vehicle 1 may obtain the image of the road by activating the image obtainer 210 while driving (301), and process the image of the obtained road to recognize the forward vehicle that is driving in front of the vehicle in the image. Here, the forward vehicle driving in front of the vehicle itself may be another vehicle driving in the same lane as the vehicle itself.

When it is determined that there is the forward vehicle driving in front (302), the vehicle 1 may obtain the distance from the forward vehicle based on the detection information detected by the distance detector 220 (303).

In addition, the vehicle 1 may obtain the distance to the forward vehicle using the image obtained by the image obtainer 210.

The vehicle 1 may compare the distance between the obtained forward vehicle and the reference distance and determine whether the distance from the forward vehicle is less than or equal to the reference distance (304).

When it is determined that the distance from the forward vehicle is less than or equal to the reference distance, the vehicle 1 may obtain the vertical change amount corresponding to the vertical movement of the forward vehicle based on the image of the forward vehicle in the obtained image (305).

The vehicle 1 may compare the obtained vertical change amount with the reference change amount to determine whether the obtained vertical change amount is greater than or equal to the reference change amount (306).

When it is determined that the obtained vertical change amount is greater than or equal to the reference change amount, the vehicle 1 may obtain the height of the obstacle present on the road surface based on the obtained vertical change amount (307).

The obstacle present on the road surface may include the pothole on the road surface or the speed bump on the road surface.

The height of the obstacle may be the depth of the pothole and the height of the speed bump.

The road condition (i.e., existence of obstacles) recognition of the road ahead and the obstacle height obtainment configuration of the road surface will be described with reference to FIGS. 7, 8A, 8B and 8C.

Figure 7:
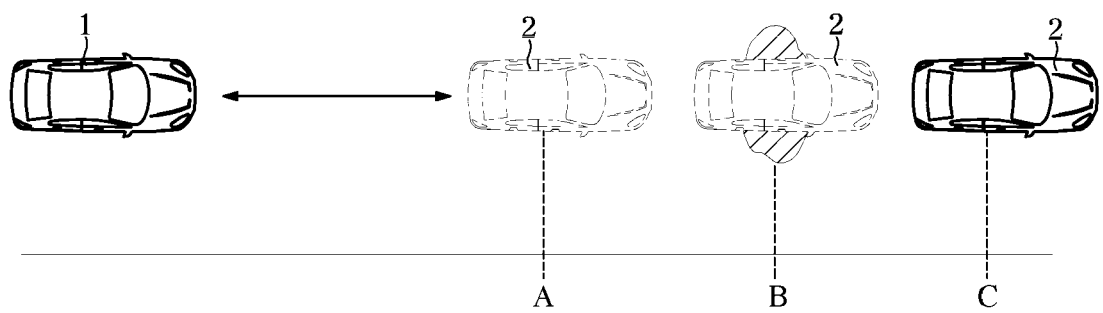
FIGS. 7, 8A, 8B, 8C, 9, 10A, 10B and 10C are exemplary views illustrating road condition recognition of a vehicle and height obtainment of an obstacle according to an exemplary embodiment.

As illustrated in FIG. 7, when the vehicle 1 may obtain the distance from a forward vehicle 2 driving in the front while driving. When it is determined that the distance from the forward vehicle 2 is less than or equal to the reference distance, the vehicle 1 may obtain a forward image using the image obtainer 210.

In this case, the vehicle 1 may obtain the image of the corresponding forward vehicle 2 before entering the pothole, after passing through the pothole, and after entering the pothole.

Figure 8A:
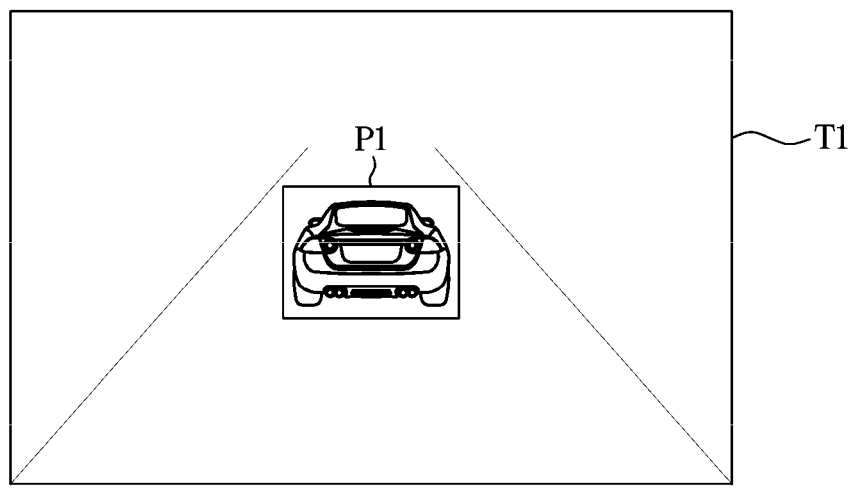

As illustrated in FIG. 8A, the vehicle 1 may obtain the image when the forward vehicle 2 drives at a first position A, and recognize the forward vehicle 2 in the obtained entire image T1, generate a first area P1 including the recognized forward vehicle 2, and recognize the position of the generated first area P1.

Figure 8B:
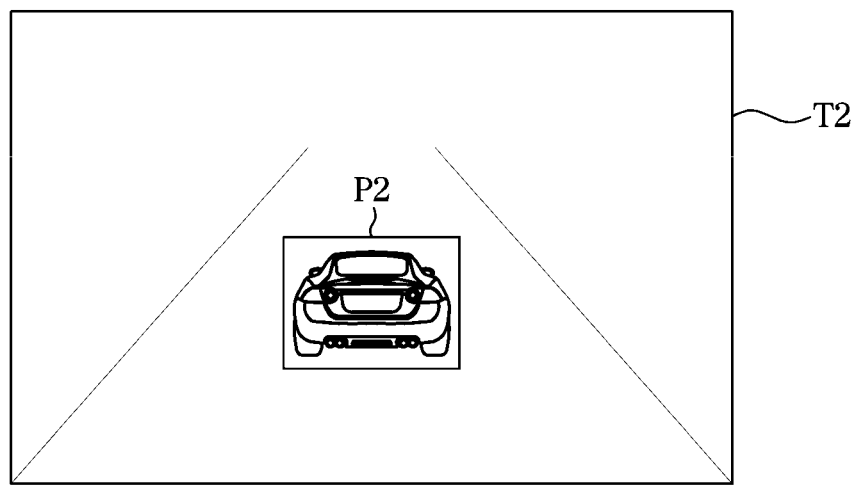

As illustrated in FIG. 8B, the vehicle 1 may obtain the image when the forward vehicle 2 drives at a second position B, and recognize the forward vehicle 2 in the obtained entire image T2, generate a second area P2 including the recognized forward vehicle 2, and recognize the position of the generated second area P2.

The vehicle may identify the vertical movement of the forward vehicle 2 by comparing a vertical position of the first area P1 and a vertical position of the second area P2, and obtain the change amount of the vertical movement when the vertical movement occurs.

Since the forward vehicle 2 falls into the pothole at the second position B, the movement occurs to the lower side, and the area where the forward vehicle 2 is located in the image obtained by the vehicle 1 is changed to the lower side.

Figure 8C:
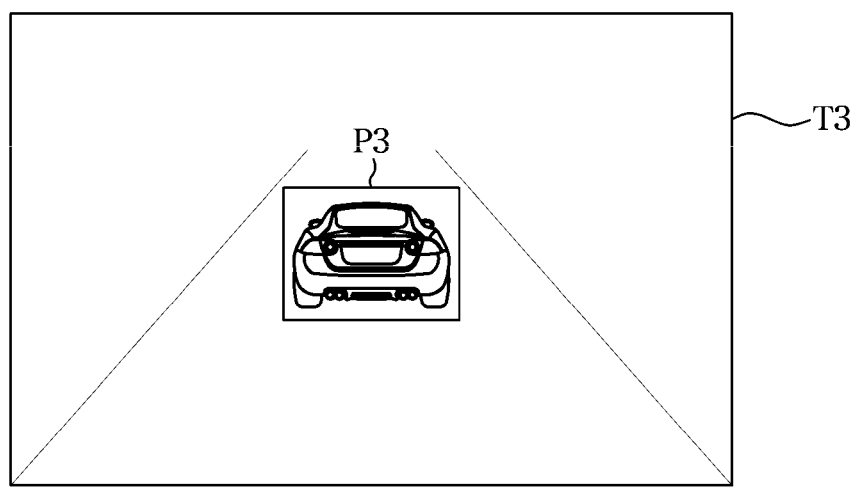

As illustrated in FIG. 8C, the vehicle 1 may obtain the image when the forward vehicle 2 drives at a third position C, and recognize the forward vehicle 2 in the obtained entire image T3, generate a third area P3 including the recognized forward vehicle 2, and recognize the position of the generated third area P3.

The vehicle may identify the vertical movement of the forward vehicle 2 by comparing a vertical position of the second area P2 and a vertical position of the third area P3, and obtain the change amount of the vertical movement when the vertical movement occurs.

Since the forward vehicle 2 exits the pothole at the third position C, the movement occurs to the upper side, and the area where the forward vehicle 2 is located in the image obtained by the vehicle 1 is changed to the upper side.

In other words, the vehicle 1 may know the vertical movement of the forward vehicle 2 and the amount of change thereof from the vertical position change of the area to which the forward vehicle 2 belongs in the image obtained by the image obtainer 210. The vehicle 1 may recognize the road condition of the forward road through the vertical movement of the forward vehicle 2, and may know the height of obstacles on the road surface through the change amount of the vertical movement of the forward vehicle 2.

The vehicle 1 may identify the driving speed of the vehicle itself and identify the reference height corresponding to the identified driving speed of the vehicle 1 (308). Here, the reference height corresponding to the driving speed may be previously stored information.

The vehicle 1 may compare the height of the obstacle with the reference height and determine whether the height of the obstacle is greater than or equal to the reference height (309). When it is determined that the height of the obstacle is less than the reference height, the vehicle 1 may display on the display 260 that it is driving safety. When it is determined that the height of the obstacle is greater than or equal to the reference height, the vehicle 1 may output the alarm information for guiding a decrease in the driving speed (310).

Here, outputting the alarm information may include lighting an indicator that is the display 260 or outputting an alarm sound through the sound outputter 250.

When the predetermined time has elapsed since the alarm information is output, the vehicle 1 may identify the driving speed again and identify the reference height corresponding to the identified driving speed.

In addition, when it is determined that the vehicle 1 has driven the predetermined distance from the time when the alarm information is output, the vehicle 1 may identify the driving speed again and identify the reference height corresponding to the identified driving speed.

The vehicle 1 may compare the height of the obstacle with the reference height and determine whether the height of the obstacle is greater than or equal to the reference height (311). When it is determined that the height of the obstacle is less than the reference height, the vehicle 1 may stop output of the alarm information. When it is determined that the height of the obstacle is greater than or equal to the reference height, the vehicle 1 may control the operation of at least one of the suspension 270 and the brake device 30 (312).

The vehicle 1 may control the operation of at least one of the suspension 270 and the brake device 30 in a state where the output of the alarm information is stopped even when it is determined that the height of the obstacle is greater than or equal to the reference height.

The vehicle 1 may also decrease the rotation speed of the engine 10 when it is determined that the height of the obstacle is greater than or equal to the reference height.

Here, controlling the operation of the suspension 270 may include increasing the damping force of the suspension 270.

In addition, the damping force of the suspension 270 may be a value corresponding to the difference between the reference height and the height of the obstacle.

Controlling the operation of the brake device 30 may include generating the braking force. Here, the braking force of the brake device 30 may be a value corresponding to the difference between the reference height and the height of the obstacle.

When the vehicle 1 determines that the forward vehicle does not exist, the vehicle 1 may obtain the road information from the image obtained by the image obtainer 210 (313), and may obtain the height of the obstacle from the obtained road information (307).

The vehicle 1 may identify the driving speed of the vehicle itself and identify the reference height corresponding to the identified driving speed of the vehicle 1 (308). Here, the reference height corresponding to the driving speed may be previously stored information.

The vehicle 1 may compare the height of the obstacle with the reference height and determine whether the height of the obstacle is greater than or equal to the reference height (309). When it is determined that the height of the obstacle is less than the reference height, the vehicle 1 may display on the display 260 that it is driving safety. When it is determined that the height of the obstacle is greater than or equal to the reference height, the vehicle 1 may output the alarm information for guiding a decrease in the driving speed (310).

When the predetermined time has elapsed since the alarm information is output, the vehicle 1 may identify the driving speed again and identify the reference height corresponding to the identified driving speed.

The vehicle 1 may compare the height of the obstacle with the reference height and determine whether the height of the obstacle is greater than or equal to the reference height (311). When it is determined that the height of the obstacle is less than the reference height, the vehicle 1 may stop output of the alarm information. When it is determined that the height of the obstacle is greater than or equal to the reference height, the vehicle 1 may control the operation of at least one of the suspension 270 and the brake device 30 (312).

The vehicle 1 may determine whether the position issued by the vertical movement of the forward vehicle 2 driving in the left side, the right side, or the left and right sides. When it is determined that the vertical movement of the vehicle 1 has occurred only on the left side or the right side, the vehicle 1 may control the operation of the left and right suspension of the vehicle body differently. When it is determined that the vertical movement of the vehicle 1 has occurred in both the left and right sides, the vehicle 1 may control the same operation of the left and right suspensions of the vehicle body.

When controlling the operation of the left and right suspensions differently, the vehicle 1 may control the heights of the left and right heights of the vehicle differently or control the damping force of the left and right suspensions differently.

This will be described with reference to FIGS. 9 and 10.

Figure 9:
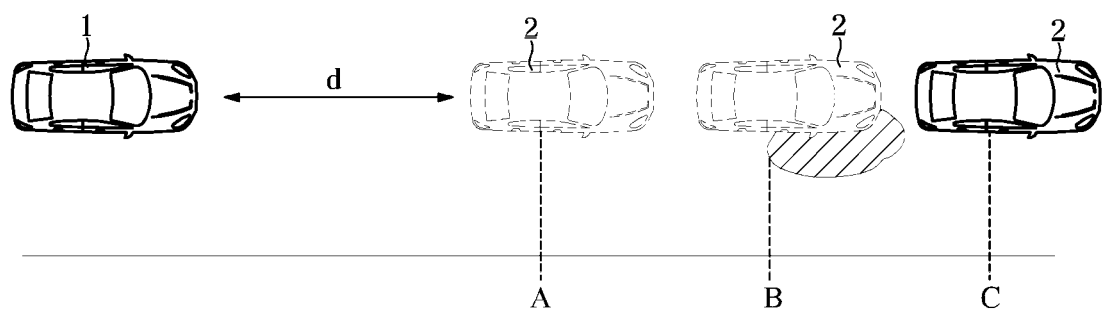

As illustrated in FIG. 9, when the vehicle 1 may obtain the distance from a forward vehicle 2 driving in the front while driving. When it is determined that the distance from the forward vehicle 2 is less than or equal to the reference distance, the vehicle 1 may obtain a forward image using the image obtainer 210.

In this case, the vehicle 1 may obtain the image of the corresponding forward vehicle 2 before entering the pothole, after passing through the pothole, and after entering the pothole.

Figure 10A:
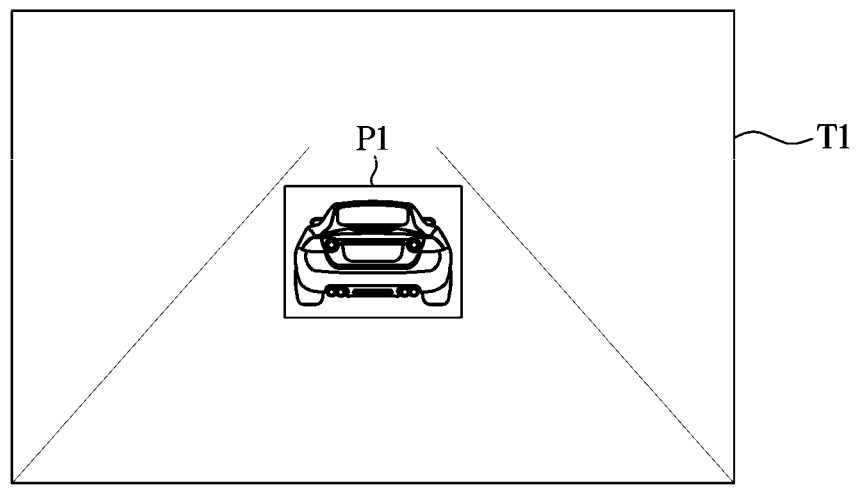

As illustrated in FIG. 10A, the vehicle 1 may obtain the image when the forward vehicle 2 drives at the first position A, and recognize the forward vehicle 2 in the obtained entire image T1, generate the first area P1 including the recognized forward vehicle 2, and recognize the position of the generated first area P1. At this time, the first area may be located parallel to the center of the image because the forward vehicle 2 is driving on the road surface of a normal road.

Figure 10B:
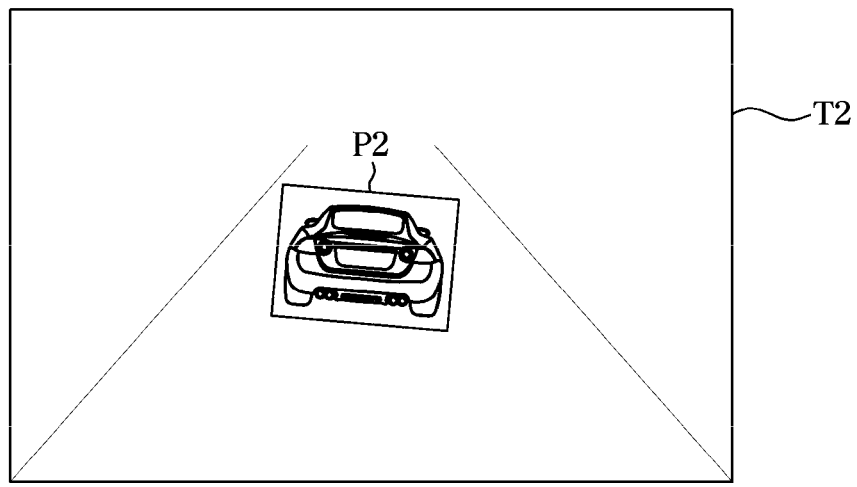

As illustrated in FIG. 10B, the vehicle 1 may obtain the image when the forward vehicle 2 drives at the second position B, and recognize the forward vehicle 2 in the obtained entire image T2, generate the second area P2 including the recognized forward vehicle 2, and recognize the position of the generated second area P2.

In the forward vehicle 2, since only the right wheel falls into the pothole in the second position B, the right side of the vehicle body moves to the lower side. In this case, the second area in which the forward vehicle 2 is located in the image obtained by the vehicle 1 may be tilted to the right side because the forward vehicle 2 is in a right pothole.

The vehicle 1 may determine whether the left and right vertical movements are the same or different by comparing the left and right vertical positions of the first area P1 and the left and right vertical positions of the second area P2, respectively. When it is determined that the left and right vertical movements of the forward vehicle 2 are different, the vehicle 1 may obtain the change amount of movement of the side where the vertical movement is greater. In other words, the vehicle 1 may obtain the change amount of the vertical movement of the right side when the vertical movement of the forward vehicle 2 is greater in the right side.

Figure 10C:
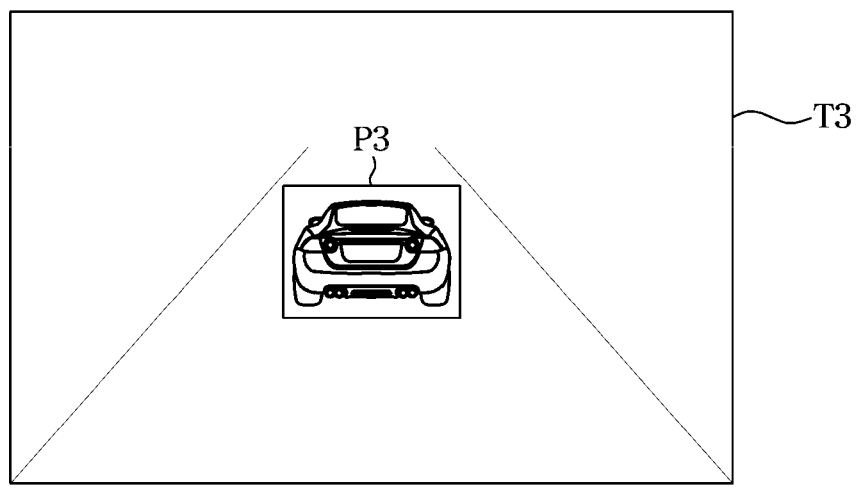

As illustrated in FIG. 10C, the vehicle 1 may obtain the image when the forward vehicle 2 drives at the third position C.

At this time, the forward vehicle 2 moves to the upper side because the right wheel exits the pothole at the third position C.

The vehicle 1 may recognize the forward vehicle 2 in the obtained entire image T3, generate the third area P3 including the recognized forward vehicle 2, and recognize the position of the generated third area P3.

At this time, the third area P3 in which the forward vehicle 2 is located in the image obtained by the vehicle 1 only the position on the right side changes to the upper side.

The vehicle 1 may determine whether the left and right vertical movements are the same or different by comparing the left and right vertical positions of the second area P2 and the left and right vertical positions of the third area P3, respectively. When it is determined that the left and right vertical movements of the forward vehicle 2 are different, the vehicle 1 may obtain the change amount of movement of the side where the vertical movement is greater. In other words, the vehicle 1 may obtain the change amount of the vertical movement of the right side when the vertical movement of the forward vehicle 2 is greater in the right side.

The vehicle 1 may know the vertical movement of the right side of the forward vehicle 2 and the amount of change thereof from the vertical position change of the right side of the area to which the forward vehicle 2 belongs in the image obtained by the image obtainer 210. The vehicle 1 may recognize the road condition of the forward road through the vertical movement of the right side of the forward vehicle 2, and may know the height of obstacles on the road surface through the change amount of the vertical movement of the right side of the forward vehicle 2.

When it is determined that the initial movement of the right side of the forward vehicle 2 has changed from the lower side to the upper side when the amount of change of the vertical movement of the right side of the forward vehicle 2 driving in front is greater than or equal to the reference change amount, the vehicle 1 may determine that the pothole exists on the road surface and control the operation of the suspension 270 to decrease the left height of the vehicle and to increase the right height of the vehicle in order to prevent the vehicle itself from being tilted to the right side by the pothole.

When it is determined that an initial movement of the right side of the forward vehicle has changed from the upper side to the lower side when the amount of change of the vertical movement of the left side of the forward vehicle 2 driving in front is greater than or equal to the reference change amount, the vehicle 1 may determine that there is the speed bump on the right side of the road surface and control the operation of the suspension 270 to decrease the right height of the vehicle and to increase the left height of the vehicle in order to prevent the vehicle itself from being tilted to the left side by the speed bump.

The vehicle 1 may control the damping force of the left and right suspension so that the damping force of the right suspension becomes higher than the damping force of the right suspension when the amount of change in the vertical movement of the right side of the forward vehicle 2 driving in front is greater than the reference change amount.

As is apparent from the above description, the embodiments of the disclosure may prevent a damage of the vehicle by controlling the driving speed based on vehicle external information (navigation information, camera image information, etc.), and also by controlling at least one of the suspension and the brake device, improve the stability and ride comfort of the vehicle, it is possible for the driver to feel the comfort and convenient for a driving situation.

The disclosure may improve the accuracy of the road condition recognition of the road ahead even at night, rain or snow.

The disclosure may reduce an accident caused by sudden braking.

As described above, the disclosure may improve the quality and the merchandise of the vehicle, further increase the users satisfaction, and secure the competitiveness of a product.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
    an image sensor disposed at the vehicle so as to have a field of view of the outside of the vehicle, configured to capture image data;
    a radar disposed at the vehicle so as to have a detecting area of the outside of the vehicle, configured to capture detecting data;
    a suspension provided adjacent to front, rear, left, and right wheels of the vehicle; and
    a controller including at least one processor configured to process the image data and the detecting data,
    wherein the controller is configured to:
        recognize a forward vehicle in response to the processing of the image data;
        obtain a distance from the forward vehicle in response to the processing of the detecting data;
        obtain a change amount of vertical movement of the forward vehicle in the image data in response to the distance from the forward vehicle that is equal to or less than a reference distance, and output deceleration guide information based on the change amount;
        recognize a height of an obstacle on a road surface in the image data in response to the distance from the forward vehicle that exceeds the reference distance, and output the deceleration guide information based on the height of the obstacle on the road surface;
        when obtaining the change amount of the vertical movement of the forward vehicle, obtain the change amount of the left and right vertical movement of the forward vehicle, respectively; and
        when the change amount of the left and right vertical movement of the forward vehicle is different, control a damping force of the left and right suspensions differently.

2. The vehicle according to claim 1, further comprising:
    a speed detector configured to detect a driving speed of the vehicle; and a storage configured to store reference speeds and reference heights respectively corresponding to the reference speeds, wherein the controller is configured to:

identify a height, among the reference heights, to correspond to the driving speed among the reference speeds stored in the storage;

obtain the height of the obstacle on the road surface corresponding to the change amount; and when the height of the obstacle on the road surface is greater than or equal to the identified height, output the deceleration guide information.

3. The vehicle according to claim 2, further comprising:

a brake device configured to generate a braking force, wherein the controller is configured to:

when a predetermined time has elapsed from the time of outputting the deceleration guide information, identify another height, among the reference heights stored in the storage, to correspond to a current driving speed among the reference speeds, wherein the current driving speed is a driving speed when the predetermined time has elapsed, and when the height of the obstacle on the road surface is greater than or equal to the identified another height, control the operation of at least one of the suspension and the brake device.

4. The vehicle according to claim 2, further comprising:

a brake device configured to generate a braking force, wherein the controller is configured to:

when a predetermined time has elapsed from the time of outputting the deceleration guide information, identify another height, among the reference heights stored in the storage, to correspond to a current driving speed among the reference speeds, wherein the current driving speed is a driving speed when the predetermined time has elapsed, and when the height of the obstacle on the road surface is greater than or equal to the identified another height, control the operation of at least one of the suspension and the brake device.

5. The vehicle according to claim 1, further comprising:

an outputter configured to output the deceleration guide information, wherein the outputter comprises at least one of a sound outputter configured to output a warning sound and a display configured to light an indicator.

6. A vehicle comprising:

an image sensor disposed at the vehicle so as to have a field of view of the outside of the vehicle, configured to capture image data;

a speed detector configured to detect a driving speed of the vehicle;

a storage configured to store reference speeds and reference heights respectively corresponding to the reference speeds, wherein the reference heights respectively corresponding to the reference speeds are determined by impact threshold values;

a suspension provided adjacent to front, rear, left, and right wheels of the vehicle; and a controller including at least one processor configured to process the image data, wherein the controller is configured to:

obtain a change amount of vertical movement of a forward vehicle in response to the processing of the image data, and obtain a height of an obstacle on a road surface corresponding to the obtained change amount, identify a height, among the reference heights, to correspond to the driving speed among the reference speeds from the storage, output deceleration guide information when the height of the obstacle on the road surface is greater than or equal to the identified height, when obtaining the change amount of the vertical movement of the forward vehicle, obtain the change amount of left and right vertical movement of the forward vehicle, respectively; and when the change amount of the left and right vertical movement of the forward vehicle is different, control a damping force of the left and right suspensions differently.

7. The vehicle according to claim 6, further comprising:

a radar disposed at the vehicle so as to have a detecting area of the outside of the vehicle, configured to capture detecting data;

wherein the controller is configured to:

recognize the height of the obstacle on the road surface in the image data in response to a distance from the forward vehicle that exceeds a reference distance, and recognize the height of the obstacle on the road surface based on the change amount of the vertical movement of the forward vehicle in response to the distance from the forward vehicle that is equal to or less than the reference distance.

8. The vehicle according to claim 6, further comprising:

a brake device configured to generate a braking force, wherein the controller is configured to:

when a predetermined time has elapsed from the time of outputting the deceleration guide information, identify another height, among the reference heights, to correspond to a current driving speed among the reference speeds, wherein the current driving speed is a driving speed when the predetermined time has elapsed, and when the height of the obstacle on the road surface is greater than or equal to the identified another height, control the operation of at least one of the suspension and the brake device.

9. A method of controlling a vehicle comprising:

recognizing a forward vehicle in response to the processing of image data captured by an image sensor disposed at the vehicle so as to have a field of view of the outside of the vehicle;

obtaining a distance from the forward vehicle in response to the processing of detecting data captured by a radar disposed at the vehicle so as to have a detecting area of the outside of the vehicle;

obtaining a change amount of vertical movement of the forward vehicle in the image data in response to the distance from the forward vehicle that is equal to or less than a reference distance;

obtaining a height of an obstacle on a road surface corresponding to the change amount;

obtaining the height of the obstacle on the road surface in the image data in response to the distance from the forward vehicle that exceeds the reference distance;

identifying a driving speed of the vehicle;

identifying a height, among reference heights, to correspond to the driving speed of the vehicle among reference speeds, wherein the reference speeds and the reference heights respectively correspond to the reference speeds are stored in a storage, wherein the reference heights respectively corresponding to the reference speeds are determined by impact threshold values; and outputting deceleration guide information in response to the height of the obstacle on the road surface that is greater than or equal to the reference height, wherein the obtaining of the change amount of vertical movement of the forward vehicle comprises:
obtaining the change amount of left and right vertical movement of the forward vehicle, respectively; and
when the change amount of the left and right vertical movement of the forward vehicle is different, operating left and right suspensions so that a damping force of the left and right suspensions are different.

10. The method according to claim 9, further comprising:
when a predetermined time has elapsed from the time of outputting the deceleration guide information, identifying another height, among the reference heights, to correspond to a current driving speed among the reference speeds, wherein the current driving speed is a driving speed when the predetermined time has elapsed;
when the height of the obstacle on the road surface is less than the identified another height, stopping output of alarm information; and
when the height of the obstacle on the road surface is greater than or equal to the identified another height, controlling the operation of at least one of the suspension and the brake device.

11. The method according to claim 9, wherein the outputting of the deceleration guide information comprises:
outputting a warning sound for guiding a deceleration or lighting an indicator.

* * * * *